Figure 1:
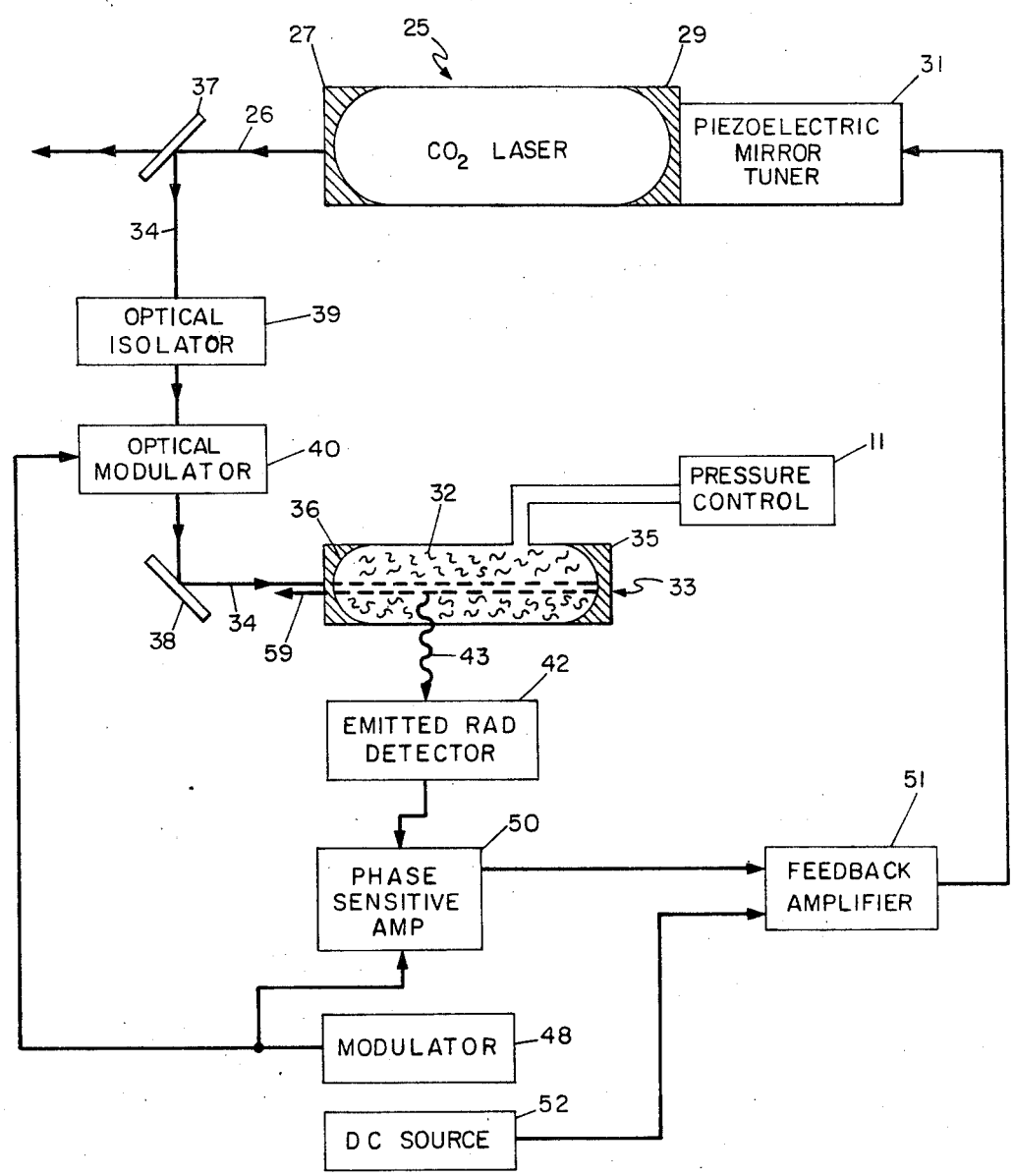

United States Patent
Javan et al.

[15] 3,686,585
[45] Aug. 22, 1972

[54] METHOD OF STABILIZING A GAS LASER

[72] Inventors: Ali Javan, 69 River St., Boston, Mass. 02154; Charles Freed, Browning Lane, Conart Rd., Lincoln, Mass. 01773

[22] Filed: May 27, 1971

[21] Appl. No.: 147,457

[52] U.S. Cl. ............................................. 331/94.5
[51] Int. Cl. ............................................. H01s 3/10
[58] Field of Search ................................. 331/94.5

[56] References Cited

UNITED STATES PATENTS

| | | | |
|---|---|---|---|
| 3,453,557 | 7/1969 | Polanyi et al. | 331/94.5 |
| 3,495,185 | 2/1970 | Herriott | 331/94.5 |
| 3,596,201 | 7/1971 | Chester | 331/94.5 |

*Primary Examiner*—William L. Sikes
*Attorney*—Arthur A. Smith, Jr., Martin M. Santa and Robert Shaw

[57] ABSTRACT

The output radiation of a gas laser is directed into a cell containing a gas with a resonant absorption line. The gas is subjected to a standing wave field of the laser radiation. A saturation resonance is detected in the emitted spontaneous radiation from an energy state collisionally coupled to an interacting energy level of the absorption transition when the laser is tuned near the center frequency of its Doppler broadened line profile. This resonance is utilized as a reference in a feedback system to frequency lock the laser to a heretofore unknown degree of stability.

10 Claims, 6 Drawing Figures

INVENTORS:
ALI JAVAN
CHARLES FREED

VELOCITY

VELOCITY

INVENTORS:
ALI JAVAN
CHARLES FREED

METHOD OF STABILIZING A GAS LASER

The invention herein described was made in the course of work performed under contracts with the United States Navy and the Electronics Systems Division, Air Force Systems Command, United States Air Force.

FIELD OF THE INVENTION

This invention relates generally to laser technology and more particularly to laser stabilization techniques.

PRIOR ART

Long term frequency stabilization of gas lasers is important in certain applications, e.g. long range and long duration, high resolution Doppler radar and other optical communication applications. In the gas laser, operation may occur anywhere within a frequency range around the center of the laser transition due to its Doppler broadened gain profile. For example, in the $CO_2$ gas laser operating on a preselected P or R branch transition of the 10.6 $\mu$m band, laser operation occurs anywhere within an approximate 40 MHz frequency range. For this reason, it is highly desirable to find a method of generating a reference within the operating range to which the laser may be frequency locked.

One well known reference is the Lamb-dip, the decrease which occurs in the output intensity versus frequency curve at the center frequency of a single mode gas laser when it is tuned across a Doppler broadened transition. This dip results from the non-linearity of the interaction between the standing wave field in the laser cavity with a gas atoms (or molecules) having velocities resonant with the Doppler shifted frequency of the field as experienced by the molecules. If the laser is detuned there are two narrow bands of velocities which interact with the standing wave field, each band corresponding to the atomic velocity required to Doppler shift one of the two traveling wave components of the standing wave into resonance. As long as the two velocity components are well separated so as not to include the same atoms, the gain of the laser will for all practical purposes follow the inverted population distribution, i.e., the well known bell-shaped curve. Similarly, although the output power is not equivalent to the gain due to the feedback inherent in the laser cavity, the output power versus frequency curve is bell-shaped. However, for strong laser fields, when the laser is tuned to the center frequency of a particular transition, a resonant dip appears in the output intensity. In this case, the traveling wave components interact with the same group of atoms, that is, those of the zero velocity class in the direction of the laser axis. The field these atoms experience is twice the field the resonant atoms experience in the detuned case, and because of the non-linearity of the interaction between the field and the atoms, the total number of atoms interacting is less than the detuned case. This produces the resonant dip in the output power versus frequency curve. For weak laser fields, the total number of atoms interacting is approximately the same in the tuned and detuned cases. However, a Lamb-dip is still observed. This is due to the fact that the gain of a laser is not solely determined by the total number of atoms which interact with the field. The dip in the weak field case is much less pronounced than the strong field case. The main limitation with this reference is that it is only observable when the laser is operated at low pressures. As the pressure is increased, the Lamb-dip broadens and becomes less pronounced.

A similar reference is the inverted Lamb-dip. This inverted dip is a peak in the center of the bell-shaped intensity versus frequency curve of output laser radiation passed through an absorption cell in which a gas absorbing medium is subjected to a standing wave field of the laser radiation. Here, when the laser is detuned, the standing wave field interacts with two velocity bands and pumps those atoms which are resonant with the Doppler shifted field as experienced by the atoms to a higher state. For strong saturating laser fields, the total population which is pumped when the laser is tuned, is less than the total of the two velocity bands of the detuned case. Hence, there is less absorption when the laser is tuned and correspondingly there is a peak at the center frequency in the output intensity versus frequency curve. The advantage of using this reference is that the laser may be operated at a high pressure while the pressure in the absorption cell is low in order to obtain a narrow resonance. An example of the inverted Lamb-dip is the resonant interaction of the 3.39 $\mu$m methane absorption line with the standing wave radiation of the 3.39 $\mu$m He-Ne laser.

One limitation in using the inverted Lamb-dip as a reference is the low coefficient of absorption for some gases. For instance, the absorption coefficient of $CO_2$ at room temperature is about $3 \times 10^{-6}$/cm at 0.01 torr whereas the coefficient of methane at 0.01 torr is about $1.8 \times 10^{-3}$/cm. For a $CO_2$ laser operating on a P (20) branch transition of the 10.6 $\mu$m band, it is difficult to observe an inverted Lamb-dip in the output radiation passed through an absorption cell due to the low absorption coefficient of the $CO_2$ gas. The low absorption coefficient results from the P (20) line of the 10.6 $\mu$m absorption band belonging to a hot band in contradistinction to the 3.39 $\mu$m methane line whose transition with its lower state belongs to the ground vibrational state. This limitation may be overcome by having long absorption cells and by heating the absorber gas. Hence, while the use of the inverted Lamb-dip as a reference allows the laser to operate at high pressure, it is limited to those gases with high absorption coefficients.

SUMMARY OF INVENTION

In view of these limitations, it is the primary object of applicants' invention to generate a new reference and to utilize this reference with a feedback system to frequency lock the output of a gas laser to a heretofore unknown degree of stability.

In accordance with the present invention, laser radiation is directed into a cell containing a gas with a resonant absorption line. The gas is subjected to a standing wave field of laser radiation. A saturation resonance is detected through a sapphire window contained in the side of the cell in the omni-directional spontaneous emitted radiation from those molecules radiating from an energy state collisionally coupled to an interacting level of the absorption transition when the laser is tuned near the center frequency of its laser transition. This reference in the intensity of the spontaneous emission versus frequency curve is utilized in a feedback system to frequency lock the laser near the center line of the particular laser transition on which it is operating. These and other objects of the present invention will become more apparent from the description below of embodiments of the invention taken in conjunction with the following figures:

FIG. 1 — Block diagram of set up utilized for generating a new reference and utilizing the reference in a feedback system to stabilize a gas laser.

Figure 2:
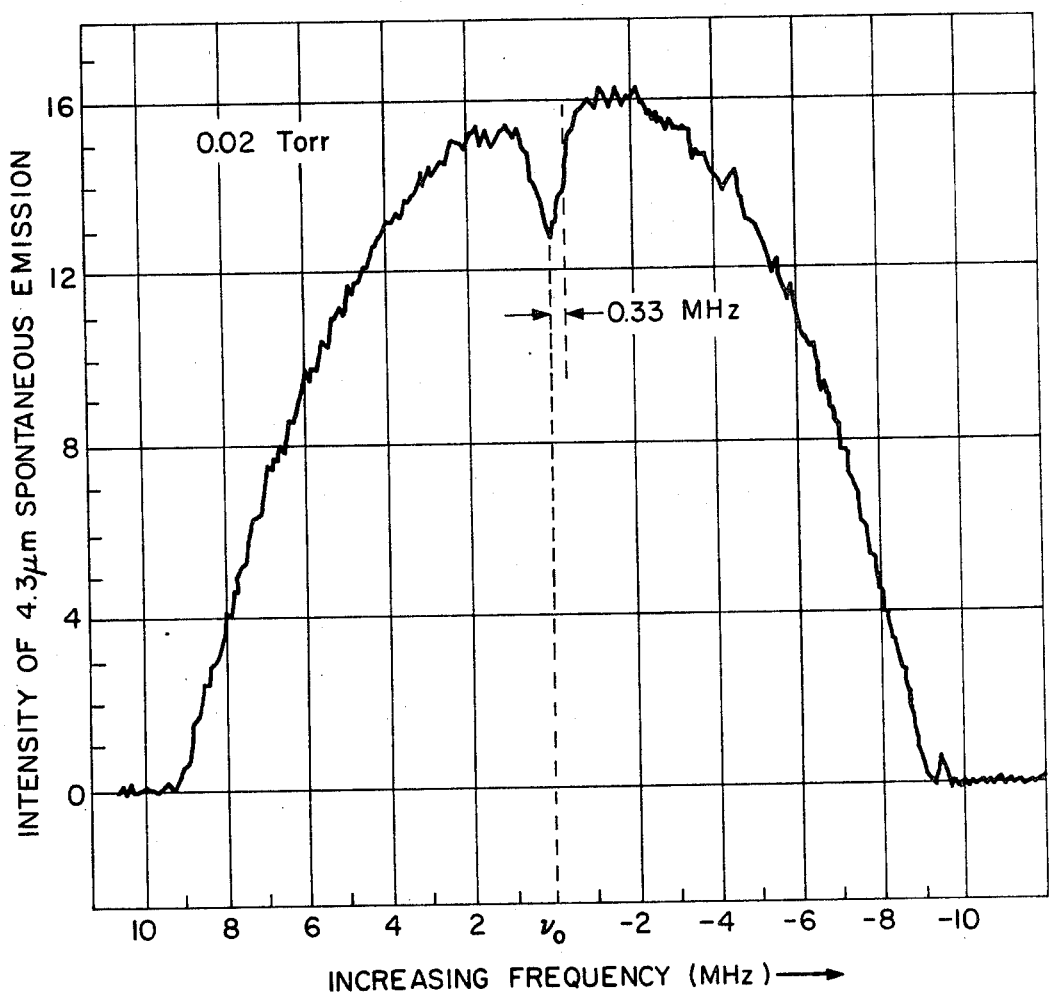

FIG. 2 — Graph of intensity of 4.3 μm spontaneous emitted radiation versus frequency.

Figure 3:
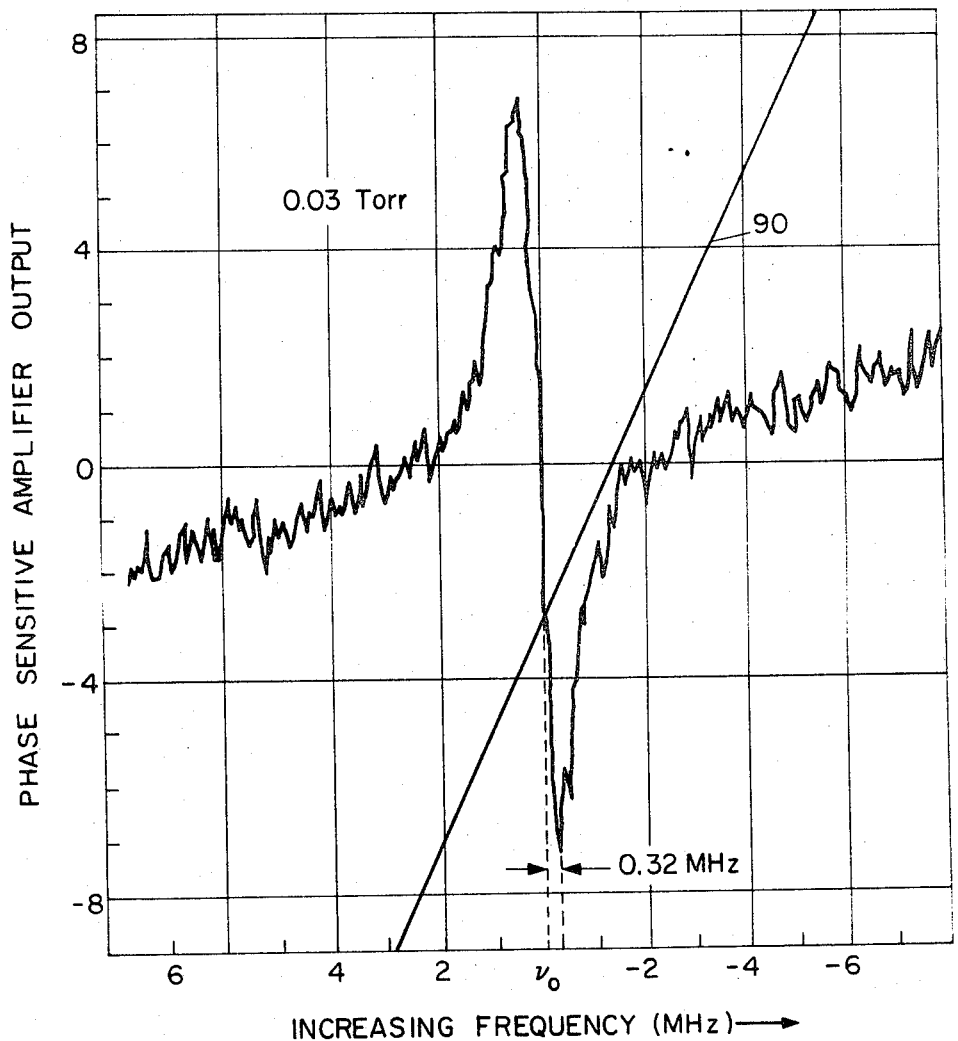

FIG. 3 — Graph of the derivative of the intensity of the emitted radiation versus frequency.

Figure 4A:
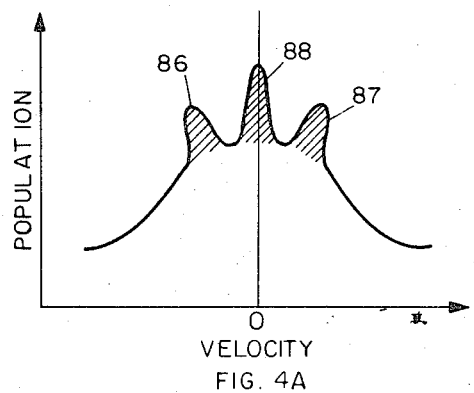

FIG. 4A— Graph of population of the upper interacting rotational state of the absorption transition versus frequency for the tuned and detuned laser.

Figure 4B:
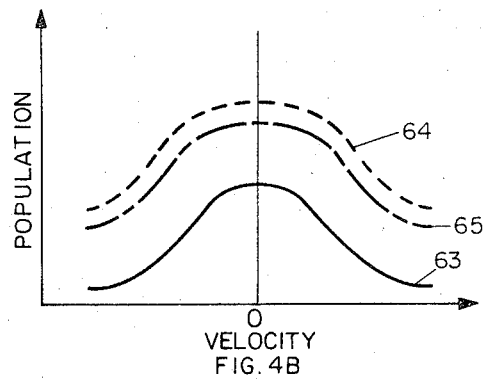

FIG. 4B— Graph of population of non-directly interacting collisional rotational states versus velocity for detuned and tuned laser in the presence of standing wave laser radiation and graph of the population versus velocity of the same states in the absence of standing wave laser radiation.

Figure 5:
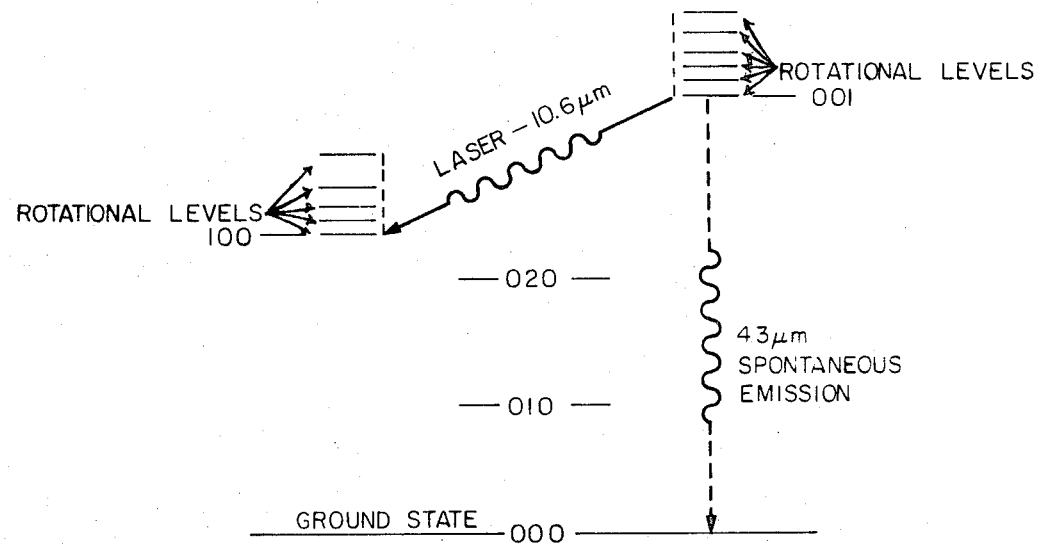

FIG. 5 — $CO_2$ Energy Level Diagram.

PREFERRED EMBODIMENT

FIG. 1 illustrates an embodiment of applicants' invention. Part of the output radiation 26 from a $CO_2$ gas laser 25 is directed by partially reflecting mirror 37 and totally reflecting mirror 38 into absorption cell 33 containing a gas 32. The cell 33 is comprised of a totally reflecting mirror 35 and partially transmitting mirror 36. The pressure of gas 32 is regulated by pressure control 11. An optical isolater 39 is inserted in the path 34 of the laser radiation to prevent any radiation 59 which is reflected by mirror 35 from re-entering the cavity of laser 25. An example of such an isolator is a four-port circulator described in IEEE Journal of Quantum Electronics, Vol. 3, No. 10, page 416, October 1970. An optical modulator 40 is also inserted in path 34 for purposes described below. Typically, such a modulator is comprised of a vibrating mirror which is electrically controlled by a crystal, and which Doppler shifts the laser radiation.

In this illustration for simplicity, we will take $CO_2$ as the gas 32 in cell 33. The $CO_2$ laser 25 is operated on a preselected P or R branch transition of the 10.6 μm band. The $CO_2$ gas 32 in cell 33 is maintained at a low pressure and subjected to standing wave radiation of the $CO_2$ laser synthesized by two running waves propagating in opposite directions between mirrors 35 and 36. The standing wave in cell 33 interacts with the $CO_2$ gas 32 and pumps the molecules up from their lower vibrational state (100) of the 10.6 μm absorption hot band to the upper vibrational state (001), whereby the population in the upper state is changed. This population change is determined by detecting the corresponding changes in the 4.3 μm spontaneous radiation from the upper vibrational state (001) to the ground state (000). A $CO_2$ energy level diagram illustrating these transitions is depicted in FIG. 5.

Cell 33 contains a sapphire window in its side for the detection of the 4.3 μm spontaneous emission signal 43 by a liquid nitrogen cooled InSb detector 42. The detector element is placed inside the cell 33 about 1.5 cm. from the path of the laser beam. FIG. 2 is a graph of the observed intensity change as the laser 25 frequency is tuned across the P (20) line profile. The laser frequency tuning is achieved by means of a piezoelectric tuner 31 which displaces mirror 29 of the laser 25 cavity. Additionally, the laser is repetively switched on and off at about 200 Hz and a phase sensitive amplifier 50 is utilized to detect the modulated 4.3 μm signal. The frequency scale of the abscissa is obtained by heterodyning the laser 25 frequency with that of a sable $CO_2$ laser oscillating at a fixed frequency and observing the change in the beat frequency as a function of the laser 25 frequency tuning. The pressure of the $CO_2$ absorber gas 32 for the curve in FIG. 2 is .02 torr. A standing wave saturation resonance appears in the form of a precise narrow "dip" in the intensity of the 4.3 μm radiation.

This resonance results basically from the non-linear nature of the interaction between the standing wave in the absorption cell 33 and the $CO_2$ molecules of the absorption gas 32. More specifically, when the $CO_2$ laser 25 is operating on a single transition, the molecules of an individual rotational level in the lower vibrational state (100) interact with the standing wave field and are pumped by the field to an individual rotational level in the upper vibrational level (001). Corresponding to the increase in the population in the particular rotational level of the upper vibrational state (001), there is an increase in the number of molecules spontaneously radiating from this rotational level to the ground state (000). This causes an increase ΔI in the intensity in the 4.3 μm emission from this rotational state to the ground state.

When the laser is detuned, there are two velocity bands of molecules in the interacting rotational level of the lower vibrational state (100) which are resonant with the traveling wave components of the Doppler shifted field as experienced by the molecules. This is illustrated in FIG. 4A by a graph of the population of the corresponding interacting rotational state in the upper vibrational state of the absorption transition versus velocity of a molecule along the axis of the standing wave. The shaded areas of the two peaks, 86 and 87, represent the increases in populations corresponding to the two velocity bands. When the laser 25 is tuned near its center frequency, the traveling wave components interact with the same group of molecules, that is, those of the zero velocity class. The field these molecules experience is twice the field the resonant molecules experience in the detuned case. The increase in the rotational state of the upper vibrational state (001) is shown by peak 88 in FIG. 4A. Due to the non-linear nature of the interaction of the standing wave field with the molecules, the total increase in population is less than the total increase in the two velocity bands in the detuned case. Accordingly, the shaded area in peak 88 is less than the sum of the shaded areas under peaks 86 and 87. This causes a sharp decrease in intensity and the resonant "dip" in FIG. 2. For strong laser fields, this resonance effects up to a 30 percent change in ΔI.

It should be noted that the change in intensity ΔI determined by detector 42 is over the entire 4.3 μm(001) → (000) spontaneous emission band. The change in the population level of the individual rotational level of the upper vibrational state (001) described above is accompanied by a change in the total population of the upper vibrational state. This is due to the collisional coupling between the rotational levels which tends to maintain thermal population distribution among them. Because of this, the population of all the rotational levels of the vibrational state (001) vary in proportion to the change induced in the population of the individual rotational level belonging to the absorption transition which interacts with the standing wave laser radiation. Accordingly, as the laser frequency is tuned across the line profile of the absorption transition the frequency dependent change in level population including the resonant behavior due to the standing wave effect, occurs in all the collisionally coupled rotational levels. These considerations are illustrated in FIG. 4B, a graph of population of a non-interacting rotational level versus velocity of the molecules along the axis of the standing wave field. Curve 63 represents the population of an individual rotational level in the absence of the standing wave field. Curve 64, represents the increased population when laser 25 is detuned; and curve 65 depicts the population when laser 25 is tuned. The increase in population illustrated by a curve 65 is approximately 20 percent less than the increase illustrated by curve 64. This accounts for the behavior of the intensity change $\Delta I$ of the 4.3 $\mu$m spontaneous emission over the entire (001) → (000) band in the $CO_2$ gas 32.

The detection of the resonance in the spontaneous emission which originates from a large number of rotationally coupled levels is particularly advantageous where the absorbing transition belongs to a hot band with a weak absorption coefficient. In principle, of course, it is possible to observe the inverted Lamb-dip in laser radiation 59 eminating from cell 33. However, at low pressures of $CO_2$ gas 32, the absorbing coefficients of the P and R branch transitions of the 10.6 $\mu$m band are small and unless the gas temperature is raised by an appreciable amount and a long absorption path is used, the effect would cause only a small change in the power of laser radiation 59, which would be very difficult to detect. At high gas 32 pressures, the inverted Lamb-dip isn't present. In contradistinction, the resonance in the omni-directional 4.3 $\mu$m emission band shown in FIG. 2 was obtained with gas 32 at 0.02 torr pressure, at room temperature, and with an absorption cell 33, 3 centimeters in length along the axis of the standing wave.

Two added features of the invention are the determination of the pressure shift and pressure broadening characteristic of the $CO_2$ gas. These are obtained by regulating the pressure of the $CO_2$ gas 32 by controlling pressure regulator 11. As the pressure is increased, the resonance becomes less pronounced and broader. The limiting widths at low pressure are due to the characteristic collision broadening and power broadening, and the broadening effect due to the molecular transit time across the diameter of laser beam 34 of the laser transition. In FIG. 3 the half-width between inflection points of the resonance is 0.32 MHz. By optimizing conditions, narrow widths can readily be obtained. The peak laser power, as shown in FIG. 2, occurs at a slightly higher frequency than the center frequency, $V_o$, of the corresponding low pressure absorption transition. By regulating the pressure of $CO_2$ gas 32, the pressure shift can be determined as a function of pressure. The determination of pressure broadening and pressure shift is important in certain applications. For instance, in very high power $CO_2$ laser amplifiers driven by a stable oscillator, there may be a very significant difference in operating pressures along the master oscillator-amplifier chain. System performance may very significantly depend on the precise determination of both pressure broadening and pressure shift.

FIG. 3 is a graph of the derivative of the intensity of the 4.3 $\mu$m signal versus the P(20) laser 25 frequency in the region of the resonance. This curve is obtained by modulating the laser radiation 34 frequency at about 100 Hz with optical modulator 40 and recording the output of phase sensitive amplifier 50. The approximately straight line 90 across the derivative curve provides a reference frequency scale. This is obtained by hetereodyning the 10.6 $\mu$m laser output 26 with that of a stable $CO_2$ laser oscillating at a fixed frequency while simultaneously recording the frequency discriminator output of the beat note.

This derivative signal is utilized in a feedback system to stabilize the $CO_2$ laser 25 on its center frequency of its operating transition. Any deviation from the frequency $V_o$ will yield a positive or negative output signal from phase detector 50 which controls a feedback amplifier 57 that is biased by DC voltage supply 52. The output correction signals of the feedback amplifier 51 controls the piezoelectric tuner 31 which in turn controls the cavity length of laser 25 by displacing mirror 29. This correction process results in long-term laser stabilizations of at least one part in $10^{11}$. This degree of stability far exceeds that which has been previously achieved.

In the arrangement depicted in FIG. 1, the absorption cell 33 is externally located with respect to laser 25. The absorption cell can be located in the laser 25 cavity by separating it from the active discharge by a Brewster angle window. Again, the 4.3 $\mu$m spontaneous emission, since it is omni-directional, can be viewed from the side of the cell in contradistinction to detection of the Lamb-dip and the inverted Lamb-dip against the presence of the full laser output. Additionally, in the above embodiment, $CO_2$ gas was utilized as the absorbing medium in cell 33. However, the choice of the gas 32 utilized does not have to be the same as that of the laser 25 to be stabilized. The only requirement is the gas used must have an absorption line which interacts with the laser 25 radiation. Likewise, in general, it is not necessary to detect the spontaneous emission radiating from an energy level collisionally coupled to the upper state of the absorption transition. Since we are concerned with a population effect, one can detect the changes in the spontaneous emission radiating from the energy state collisionally coupled to the lower level. In this case a peak will be observed at resonance since there will be a sharp decrease in the number of molecules pumped from the lower state to the upper state of the absorption transition. (In the case of $CO_2$, this is not feasible as the molecules do not radiate from the (100) vibrational state to a lower level.) The important factor here is the alternation of the velocity distribution of the absorber population due to the presence of a saturating standing wave field. As such, the effect is solely a population effect in contradistinction to the Lamb-dip and does not require monitoring of the laser 25 intensity, but merely the study of the spontaneous emission from a level of the absorption transition. The emission is uniform in all directions and at a frequency well away from that of the laser 25.

Lastly, in addition to the advantages of the invention described above, one should note the significance of achieving such a high degree of stability and its use as a time and distance standard. Existing atomic clocks operating in the microwave region do not have the high degree of long term stability that results from applicants' invention.

The appended claims are intended to cover all the embodiments of applicants' invention with all modifications and changes which occur to those skilled in the art as fall within the spirit of the invention.

What is claimed is:

1. A method of stabilizing a tunable gas laser operating on a single mode to a high degree of long term stability comprising;
    a. subjecting a gas with a resonant absorption line to a saturating standing wave field of radiation from the laser,
    b. detecting a resonance in the intensity of omnidirectional spontaneous emitted radiation from an energy state collisionally coupled to an interacting energy level of the absorption transition,
    c. utilizing the resonance as a reference and obtaining a correction signal corresponding to changes in the intensity from resonance,
    d. feeding back and applying said correction signal to the tunable laser, whereby the laser is frequency locked near the center frequency of the laser transition to a high degree of stability.

2. A method of stabilizing a tunable gas laser operating on a single mode to a high degree of long term stability comprising:
    a. subjecting a gas with a resonant absorption line to a saturating standing wave field of laser radiation,
    b. detecting a resonance in the intensity of omnidirectional spontaneous emitted radiation from an energy state collisionally coupled to an interacting energy level of the absorption transition,
    c. utilizing the resonance as a reference in a feedback system to frequency lock the laser at the line profile center of the absorption transition.

3. A method of stabilizing a gas laser operating on a single mode as recited in claim 1 wherein a resonant-dip is detected in the intensity of omni-directional spontaneous emitted radiation from an energy state collisionally coupled to the upper interacting energy level of the absorption transition.

4. A method of stabilizing a gas laser operating on a single mode as recited in claim 1 wherein a resonant peak is detected in the intensity of omni-directional spontaneous emitted radiation from an energy state collisionally coupled to the lower interacting energy level of the absorption transition.

5. A method of stabilizing a gas laser operating on a single mode as recited in claim 1 wherein a resonance is detected in the intensity of omni-directional spontaneous emitted radiation from an individual interacting energy level of the absorption transition.

6. A method of stabilizing a gas laser operating on a single mode as recited in claim 1 wherein the gas subjected to the saturating standing wave field is maintained at a low pressure.

7. A method of stabilizing a gas laser operating on a single mode as recited in claim 1 wherein the gas subjected to the standing wave field is the same as that of the gas laser.

8. A method of stabilizing a gas laser operating on a single mode as recited in claim 7, wherein the gas subjected to the standing wave field is maintained at the same pressure as the laser gas, whereby the laser is frequency locked to its center frequency.

9. A method of stabilizing a tunable $CO_2$ gas laser operating on a single mode on a preselected P or R branch transition of the 10.6 $\mu$m band to a high degree of stability comprising;
    a. subjecting $CO_2$ gas at a low pressure to a standing saturating wave field of radiation from the laser,
    b. detecting a resonant dip in the intensity of the 4.3 $\mu$m spontaneous emission band radiating from the vibrational state collisionally coupled to the upper rotational level of the absorption transition to the ground state.
    c. utilizing the resonant dip in a feedback system to frequency lock the $CO_2$ gas laser at the line profile center of the absorbing transition.

10. A method of stabilizing a $CO_2$ laser as recited in Claim 8 wherein the pressure of the $CO_2$ gas subjected to the saturating wave field is maintained at the same operating pressure of the laser whereby the laser is frequency locked to the center frequency of the particular preselected laser transition.

* * * * *